United States Patent
Mendelowitz et al.

(10) Patent No.: US 12,309,175 B2
(45) Date of Patent: May 20, 2025

(54) USING STAGED MACHINE LEARNING TO ENHANCE VEHICLES CYBERSECURITY

(71) Applicant: Red Bend Ltd., Hod Hasharon (IL)

(72) Inventors: Shachar Mendelowitz, Hertzeliya (IL); Nir Morgulis, Petah Tikva (IL)

(73) Assignee: RED BEND LTD., Hod Hasharon (IL)

( * ) Notice: Subject to any disclaimer, the term of this patent is extended or adjusted under 35 U.S.C. 154(b) by 303 days.

(21) Appl. No.: 17/806,921

(22) Filed: Jun. 14, 2022

(65) Prior Publication Data

US 2022/0400125 A1 Dec. 15, 2022

(30) Foreign Application Priority Data

Jun. 14, 2021 (IL) .......................................... 283977

(51) Int. Cl.
| | |
|---|---|
| *G06N 20/00* | (2019.01) |
| *G06F 18/214* | (2023.01) |
| *G06F 21/55* | (2013.01) |
| *G06N 3/045* | (2023.01) |

(Continued)

(52) U.S. Cl.
CPC ........ *H04L 63/1416* (2013.01); *G06F 18/214* (2023.01); *G06F 21/55* (2013.01);
(Continued)

(58) Field of Classification Search
CPC ...... B60R 16/02; B60R 16/023; G06N 20/00; G06N 3/02; G06N 3/04; G06N 3/044; G06N 3/045; G06N 3/08; G06N 3/088; G06F 18/20; G06F 18/21; G06F 18/214; G06F 21/50; G06F 21/55; H04L 63/14;
(Continued)

(56) References Cited

U.S. PATENT DOCUMENTS

| | | | |
|---|---|---|---|
| 2015/0067857 A1* | 3/2015 | Symons ................ | G06N 20/00 726/23 |
| 2017/0244737 A1* | 8/2017 | Kuperman ............ | G06N 3/084 |

(Continued)

OTHER PUBLICATIONS

Radoglou-Grammatikis, P. et al., "DIDEROT: an intrusion detection and prevention system for DNP3-based SCADA systems," ARES'20: Proceedings of the 15th International Conference on Availability, Reliability and Security, Aug. 25, 2020, Virtual Event Ireland, 8 pages.

(Continued)

*Primary Examiner* — D'Arcy Winston Straub
(74) *Attorney, Agent, or Firm* — McCoy Russell LLP

(57) ABSTRACT

Disclosed herein are systems and methods for detecting potential malicious attacks in vehicles operational environment using staged Machine Learning (ML), comprising creating a plurality of features vectors each comprising a plurality of features extracted from vehicle operational data generated by a plurality of devices deployed in one or more vehicles which is indicative of operation of the one or more vehicles, detecting, in real-time, a plurality of anomaly feature vectors using one or more unsupervised ML models applied to the plurality of feature vectors, identifying, in real-time, one or more potential cyberattack events using one or more supervised ML models applied to the plurality of anomaly feature vectors, and generating an alert indicative of the one or more potential cyberattack events.

14 Claims, 8 Drawing Sheets

(51) Int. Cl.
  *G06N 3/08* (2023.01)
  *G06N 3/088* (2023.01)
  *H04L 9/40* (2022.01)
  *H04W 4/40* (2018.01)
  *B60R 16/023* (2006.01)
  *G06N 3/044* (2023.01)

(52) U.S. Cl.
  CPC ............... *G06N 3/045* (2023.01); *G06N 3/08* (2013.01); *G06N 3/088* (2013.01); *G06N 20/00* (2019.01); *H04W 4/40* (2018.02); *B60R 16/023* (2013.01); *G06N 3/044* (2023.01)

(58) Field of Classification Search
  CPC .. H04L 63/1408; H04L 63/1416; H04W 4/30; H04W 4/40
  See application file for complete search history.

(56) References Cited

U.S. PATENT DOCUMENTS

| | | | |
|---|---|---|---|
| 2018/0096261 A1* | 4/2018 | Chu | G06N 20/20 |
| 2020/0127892 A1* | 4/2020 | Savalle | H04L 41/0894 |
| 2020/0145433 A1* | 5/2020 | Gutierrez | H04L 63/1425 |
| 2021/0037044 A1* | 2/2021 | Achanta | G06N 3/047 |
| 2024/0039940 A1* | 2/2024 | Mitani | H04L 41/16 |

OTHER PUBLICATIONS

European Patent Office, Extended European Search Report Issued in Application No. 22178846.6, Nov. 8, 2022, Germany, 8 pages.

\* cited by examiner

USING STAGED MACHINE LEARNING TO ENHANCE VEHICLES CYBERSECURITY

CROSS REFERENCE TO RELATED APPLICATIONS

This application claims priority to Israeli Patent Application No. 283977 titled "ACTIVE FALSE POSITIVE REDUCTION FOR CYBERSECURITY AND VEHICLE DIAGNOSTICS MALFUNCTIONS" filed Jun. 14, 2021. The entire contents of the above-listed application is hereby incorporated by reference for all purposes.

BACKGROUND

Some embodiments described herein relate to using Machine Learning (ML) models for detecting potential cyberattacks in vehicles environment, and, more specifically, but not exclusively, to using a staged pipeline of unsupervised and supervised ML models for detecting potential cyberattacks in vehicles environment.

As opposed to the past when vehicles used to be mostly mechanical isolated entities, modern vehicles are highly automated through the deployment of a plurality of electronic devices, Electronic Control Units (ECUs), monitor and control systems, and/or the like.

This trend is highly intensified and expanded with the rapid development and deployment of partially autonomous vehicles which are already in common use and autonomous vehicles which are likely to appear in the near future.

Such automated vehicles and more so connected vehicles which communicate with remote systems, services, platforms and/or infrastructure may be highly vulnerable to cyber threats, attacks and/or malicious actions since the automated vehicle operational environments host computing devices which may be compromised.

As result cybersecurity of the operational in vehicles environment has become a major concern and focal point for many organizations, companies, research centers, governmental agencies and more investing massive resources, effort, and research in attempt to develop cybersecurity measures aiming to increase safety, security, privacy and/or the like in vehicle's environment.

SUMMARY

According to a first aspect described herein there is provided a method of detecting potential malicious attacks in vehicles operational environment using staged ML, comprising using one or more processors configured for:
  Creating a plurality of features vectors each comprising a plurality of features extracted from vehicle operational data generated by a plurality of devices deployed in one or more vehicles. The vehicle operational data is indicative of operation of the one or more vehicles.
  Detecting, in real-time, a plurality of anomaly feature vectors using one or more unsupervised ML models applied to the plurality of feature vectors. The one or more unsupervised ML models are trained using a plurality of unlabeled training feature vectors.
  Identifying, in real-time, one or more potential cyberattack events using one or more supervised ML models applied to the plurality of anomaly feature vectors. The one or more supervised ML models are trained using a plurality of labeled training feature vectors.
  Generating an alert indicative of the one or more potential cyberattack events.

According to a second aspect described herein there is provided a system for detecting potential malicious attacks in vehicles operational environment using staged ML, comprising a program store storing a code, and one or more processors coupled to the program store for executing the stored code. The code comprising:
  Code instructions to create a plurality of features vectors each comprising a plurality of features extracted from vehicle operational data generated by a plurality of devices deployed in one or more vehicles. The vehicle operational data is indicative of operation of the one or more vehicles.
  Code instructions to detect, in real-time, a plurality of anomaly feature vectors using one or more unsupervised ML models applied to the plurality of feature vectors. The one or more unsupervised ML models are trained using a plurality of unlabeled training feature vectors.
  Code instructions to identify, in real-time, one or more potential cyberattack events using one or more supervised ML models applied to the plurality of anomaly feature vectors. The one or more supervised ML models are trained using a plurality of labeled training feature vectors.
  Code instructions to generate an alert indicative of the one or more potential cyberattack events.

In a further implementation form of the first and/or second aspects, the one or more unsupervised ML models are configured with a threshold set to yield a maximal recall value to yield no false negative detection at the expense of high false positive detection.

In a further implementation form of the first and/or second aspects, the number of the plurality of labeled training feature vectors is significantly smaller than the number of the plurality of unlabeled training feature vectors.

In a further implementation form of the first and/or second aspects, each of the plurality of feature vectors reflects a respective one of a plurality of time windows temporally arranging the plurality of features of the respective feature vector according to their timing.

In an optional implementation form of the first and/or second aspects, each of the plurality of time windows is normalized.

In an optional implementation form of the first and/or second aspects, the one or more unsupervised ML models are configured to apply dimension reduction and dimension reconstruction to the plurality of feature vectors.

In a further implementation form of the first and/or second aspects, the one or more unsupervised ML models are configured to classify each of the plurality of feature vectors as an anomaly feature vector or not based on a reconstruction error of the respective feature vector.

In a further implementation form of the first and/or second aspects, the one or more supervised ML models are trained to learn a plurality of anomaly events typical to the one or more vehicles using the plurality of labeled training feature vectors. Each of the plurality of labeled training feature vectors is associated with a respective label mapping the respective labeled training feature vector to one or more failure pattern identified based on analysis of the plurality of features of the respective labeled training feature vector and/or the vehicle operational data from which the plurality of features of the respective labeled training feature vector are derived.

In a further implementation form of the first and/or second aspects, the one or more supervised ML models are further trained in one or more semi-supervised training sessions using the plurality of labeled training feature vectors and further using a plurality of unlabeled training feature vectors.

In a further implementation form of the first and/or second aspects, one or more of the plurality of unlabeled training feature vectors and/or one or more of the plurality of labeled training feature vectors are created based on data captured by a plurality of devices deployed in a plurality of vehicles similar to the one or more vehicles.

In a further implementation form of the first and/or second aspects, one or more of the plurality of unlabeled training feature vectors and/or one or more of the plurality of labeled training feature vectors are created based on synthetic data created using one or more algorithm configured to simulate operation of the one or more vehicles.

In a further implementation form of the first and/or second aspects, each of the one or more unsupervised ML models and the one or more supervised ML models is a member of a group consisting of: a neural network, a deep neural network, a classifier, an autoencoder, and a support vector machine (SVM).

In a further implementation form of the first and/or second aspects, the neural network and/or the deep neural network comprise a convolutional neural network (CNN).

In a further implementation form of the first and/or second aspects, the one or more processors are deployed in the one or more vehicles such that the plurality of anomaly events and the one or more potential cyberattack event are identified locally in the one or more vehicles.

In a further implementation form of the first and/or second aspects, the one or more processors are deployed in one or more remote systems configured to detect the plurality of anomaly events and the one or more potential cyberattack events based on the data received from the one or more vehicles via one or more communication channels.

In a further implementation form of the first and/or second aspects, each of the plurality of devices deployed in the one or more vehicle is a member of a group consisting of: a sensor, a monitoring circuit, a user interface device, and an electronic control unit (ECU).

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which some embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of some embodiments described herein can involve performing or completing selected tasks automatically. Moreover, according to actual instrumentation and equipment of embodiments of the method and/or system described herein, several selected tasks could be implemented by hardware, by software or by firmware or by a combination thereof using an operating system.

For example, hardware for performing selected tasks according to some embodiments described herein could be implemented as a chip or a circuit. As software, selected tasks according to embodiments described herein could be implemented as a plurality of software instructions being executed by a computer using any suitable operating system. In an exemplary embodiment described herein, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars are shown by way of example and for purposes of illustrative discussion of embodiments described herein. In this regard, the description taken with the drawings makes apparent to those skilled in the art how embodiments described herein may be practiced.

In the drawings.

DETAILED DESCRIPTION

Figure 1:
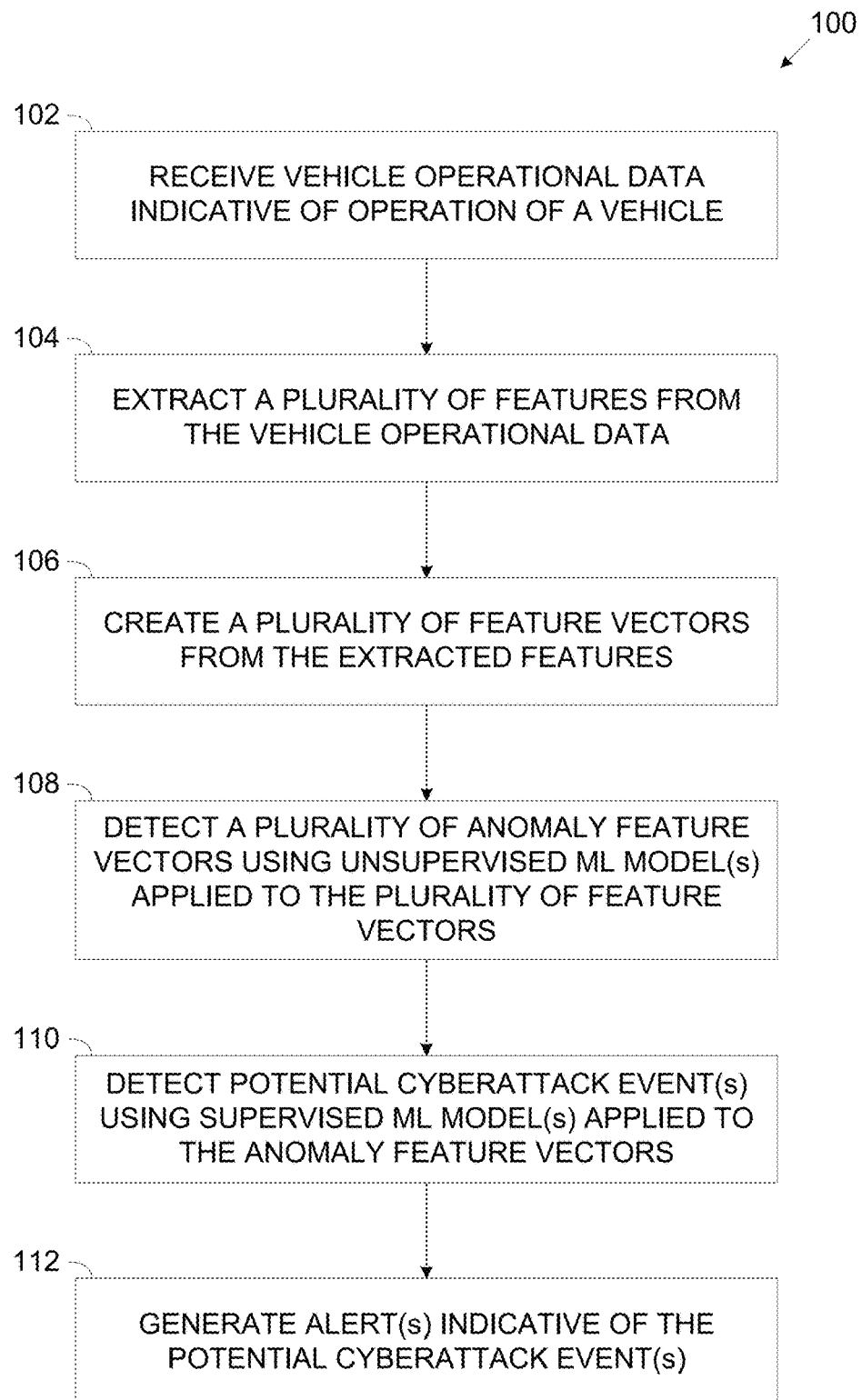
FIG. 1 is a flowchart of an exemplary process of detecting potential cyberattacks in a vehicle's environment using a staged pipeline of unsupervised and supervised ML models, according to some embodiments described herein.

Some embodiments described herein relate to using ML models for detecting potential cyberattacks in vehicles environment, and, more specifically, but not exclusively, to using a pipeline of unsupervised and supervised ML models for detecting potential cyberattacks in vehicles environment.

According to some embodiments described herein, there are provided methods, systems, devices and computer program products for using a plurality of ML models and/or Deep Learning (DL) models (collectively designated ML models herein after), for example, a neural network, a deep neural network, a classifier, a Support Vector Machine (SVM) and/or the like to detect potential cyberattacks in the operational environment of one or more vehicles initiated in malicious attempt to compromise (e.g., hijack, take control, access data, etc.) one or more systems, devices and/or services of the vehicle.

The ML models may be configured and trained to learn and identify known anomalies, i.e., failures, events, modes, patterns and/or the like which are known for the vehicle since they may be traced to one or more observed, typical, and/or common failures, malfunctions, abnormal operation, deviations and/or the like of one or more devices of the vehicle. Therefore, an anomaly event which is unknown (not learned) by the ML models may be indicative of one or more potential cyberattack events and may be classified accordingly.

In particular, detection of the potential cyberattack events is done using a two-stage ML pipeline comprising a first stage of one or more unsupervised ML models followed by a second stage of one or more supervised ML models.

In the first stage, the unsupervised ML model(s) may be applied to analyze vehicle operational data generated by a plurality of devices deployed in the vehicle, for example, sensors, monitoring devices, ECUs, visualization devices, user interface devices and/or the like. The unsupervised ML model(s) trained in one or more unsupervised sessions using unlabeled training data may classify a plurality of feature vectors extracted from vehicle operational data to identify a plurality of anomaly feature vectors which may correspond to one or more anomaly events in the operation of the vehicle.

Using the unlabeled training data captured and collected from a plurality of vehicles during a plurality of trips, the unsupervised ML model(s) may be therefore trained and learned to filter out normal feature vectors expressing normal operation of the vehicle and classify suspicious feature vectors as anomaly feature vectors. Since the vast majority of the feature vectors extracted from the vehicle operational data may correspond to normal operation of the vehicle, the unsupervised ML model(s) may classify only a relatively small group of the feature vectors as anomaly feature vectors.

Moreover, in order to ensure that most and potentially all anomaly events are detected, the trained unsupervised ML model(s) may be configured with a detection threshold adjusted for high recall in order to achieve low and potentially no false negative detection typically at the expense of high false positive classification. As result of its high recall configuration, the unsupervised ML model(s) may suffer a relatively high false positives rate detection since it may classify feature vectors corresponding to known anomalies as anomalies and may even classify normal events in the operational environment of the vehicle as anomaly events.

In order to remove (filter) the false positive anomaly events detected by the unsupervised ML model(s) and erroneously classified as anomalies, the plurality of anomaly events may be injected to the supervised ML model(s) of the second stage.

The supervised ML model(s) may be trained in one or more supervised sessions using labeled training data which maps (labels) the plurality of known anomalies, i.e., the failures events, modes, patterns and/or the like known for the vehicle. As such, using the labeled training data, the supervised ML model(s) may be learned to effectively, accurately, reliably, and/or consistently classify and identify the known anomalies.

The trained supervised ML applied to the anomaly events may therefor classify and filter out accordingly the false positive detections made by the unsupervised ML which correspond to known anomalies and identify and classify as anomaly events such anomaly events which are unknown for the vehicle and may be thus indicative of one or more potential cyberattack events.

In response to detection of one or more of the potential cyberattack events one or more actions may be initiated in order to encounter these potential cyberattacks in attempt to protect and/or secure the vehicle and/or one or more other parties which may be exposed to these potential cyberattacks, for example, one or more other vehicles, one or more systems, services, platforms and/or infrastructures serving the vehicles.

The two-stage ML pipeline configured, trained and deployed to detect potential cyberattack events in vehicles' environment may present major advantages and benefits compared to existing vehicle cybersecurity methods and systems.

First, some of the existing cybersecurity systems may employ single architecture ML models, specifically unsupervised ML models which may be trained and learned to classify and/or cluster events in the operational environment of vehicles and identify and/or infer accordingly of anomaly events. Such approach may be beneficial since the unsupervised ML models may be trained using unlabeled training data which may be available in abundance since simply collecting vehicle operational data from a plurality of vehicles may be simple, low effort task which is not time nor computing resources demanding.

However, such unsupervised ML models which are not trained with labeled training data explicitly mapping known anomalies in the vehicle's operational environment may be highly limited by their inherent tradeoff between false positive detection and false negative detection. Configuring the unsupervised ML models for low false negative in attempt to identify most and potentially all of the anomalies may yield a very high false positive detection which may lead to taking major redundant and unnecessary measures in response to supposedly cyberattack events which in reality are known anomalies and possibly even normal events. On the other hand, configuring the unsupervised ML models for lower false positive may result in misdetection of real anomalies which may relate to one or more cyberattack events thus exposing the vehicle and/or the other parties to risk.

The two-stage ML pipeline, on the other hand, may eliminate these limitations imposed by the inherent limitation of the unsupervised ML models since the unsupervised ML model of the first stage may be configured for very low false negative (high recall) thus ensuring all anomalies are detected at the expense of high false positive detection. However, the anomalies detected by the unsupervised ML model of the first stage are further analyzed and classified by the supervised ML model of the second stage which are trained and learned to effectively, accurately, reliably, and/or consistently classify and identify the known anomalies. The supervised ML model may therefore filter out the false positive anomalies and identify the unknown anomalies with just the same effectivity, accuracy, reliability, and/or consistency.

As such, the two-stage ML pipeline may significantly increase performance of the cyberattack events detection compared to the legacy system using unsupervised machine learning. This significant performance improvement is demonstrated in detail herein after.

Moreover, some of the existing cybersecurity systems may employ only supervised learning, i.e., supervised ML models which may be trained and learned to classify, identify and/or infer anomaly events using labeled training data explicitly mapping known anomalies in the vehicle's operational environment. However, in order to make such supervised ML models sufficiently accurate, reliable and/or consistent, a very large labeled training dataset must be used which encompasses practically all events that may occur in the vehicles' operational environment. Labeling such a huge training dataset may be extremely time consuming, computing resources intensive (processing resources, storage resources, network resources, etc.), and may further require massive manual work by experts to analyze the training dataset and label it accordingly.

In contrast, in the two-stage ML pipeline architecture, the supervised ML model of the second phase may be employed to a significantly small group of anomaly events identified as such by the unsupervised ML model(s) of the first phase thus significantly reducing the labeled training dataset which may be needed to effectively train the supervised ML model(s). The labeled training dataset may be significantly reduced since the supervised ML model may be trained and learned to classify and identify accordingly only anomalies which are misidentified by the unsupervised ML model(s) which as stated herein before may constitute only a very small subset of the overall space of events in the vehicle's environment. The labeled training dataset may be therefore significantly small, i.e., a fraction of the unlabeled training dataset, thus significantly reducing the time, computing resources, and/or manual effort involved in creating it (the labeled training dataset).

Furthermore, since the supervised ML model(s) of the staged ML pipeline is trained with the small subset of anomaly events, the effort, time and/or computing resources invested to train the supervised ML model(s) may be significantly reduced compared to the existing supervised ML based methods using supervised ML model(s) trained with a significantly larger and typically extremely larger dataset.

In addition, labeling only a small subset of anomaly events detected and classified accordingly by the unsupervised ML model(s) may allow incorporating the human expert knowledge on post-processed and filtered data which may consist highly relevant data. This approach may significantly reduce expert(s) effort and/or time compared to the traditional systems where in order to enable human experts to intervene and add model explain-ability (human expert knowledge), the human expert(s) must review the entire raw data which may be mostly irrelevant and only then train on it.

Before explaining at least one embodiment in detail, it is to be understood that the embodiments are not necessarily limited in its application to the details of construction and the arrangement of the components and/or methods set forth in the following description and/or illustrated in the drawings and/or the Examples. The embodiments described herein are capable of other embodiments or of being practiced or carried out in various ways.

As will be appreciated by one skilled in the art, aspects of embodiments described herein may be embodied as a system, method or computer program product. Accordingly, aspects of embodiments described herein may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of embodiments described herein may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of embodiments described herein may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of some embodiments described herein.

Aspects of some embodiments described herein are described herein with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of detecting potential cyberattacks in a vehicle's environment using a staged pipeline of unsupervised and supervised ML models, according to some embodiments described herein.

An exemplary process 100 may be executed to detect potential cyberattacks in the operational environment of one or more vehicles initiated in malicious attempt to compromise (e.g., hijack, take control, access data, etc.) one or more systems, devices and/or services of the vehicle.

Detection of the potential cyberattacks may be done using one or more ML models trained to detect anomalies (anomaly events) in the operational environment of one or more vehicles and further estimate and/or predict whether each detected anomaly is a potential cyberattack.

In particular, the process 100 is a two-stage ML based process where in the first stage operational data of the vehicle is first classified using unsupervised ML to identify a plurality of anomaly events. In particular, the unsupervised ML may be configured for high recall which may prevent false negative detections but may yield a large number of false positive detections.

The false detections may comprise anomalies which may be traced to failure, malfunction, abnormal operation, deviation and/or the like of one or more devices of the vehicle which are thus known (observed) anomalies typical, common and/or learned for the vehicle.

In the second phase of the process, the anomaly events detected by the unsupervised ML are analyzed by supervised ML trained to learn the anomalies known for the vehicle such that the supervised ML may filter out the false positive detections of the unsupervised ML and identify anomalies unknown for the vehicle which may be therefore indicative of potential cyberattack events.

To this end, one or more trained unsupervised ML models are first applied to analyze the operational data of the vehicle and detect anomaly events. Moreover, in order to ensure that most and potentially all of the anomaly events are detected, the unsupervised ML model(s) may be configured with a detection threshold value set to produce low and potentially no false negative classifications typically at the expense of high false positive detections.

One or more supervised ML models trained to learn the known anomalies of the vehicle may be than applied to the anomaly events detected by the unsupervised ML model(s) in order to filter out the known anomaly events and classify the remaining (unfiltered) anomaly events as potential cyberattack events.

Figure 2A:
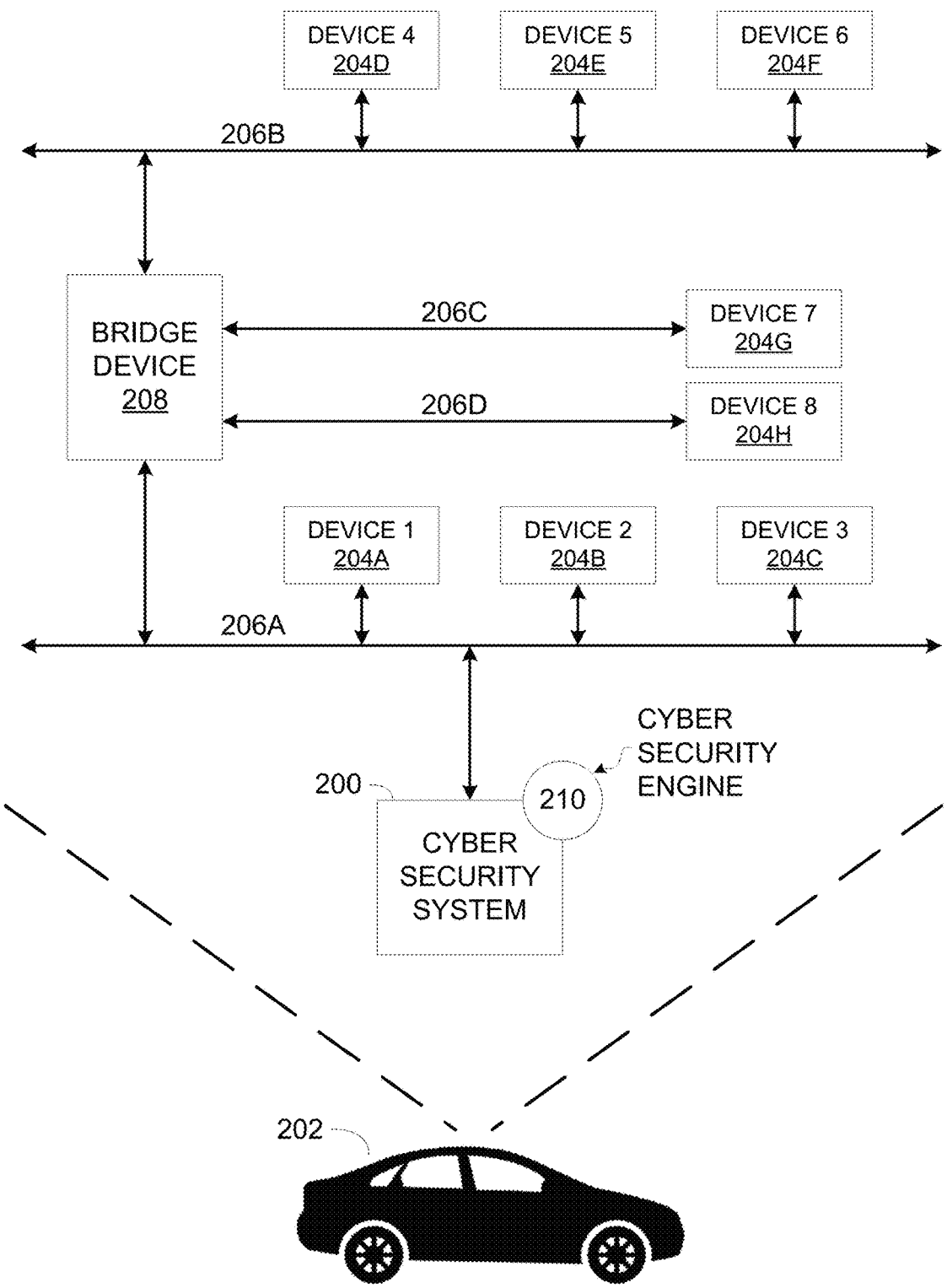
FIG. 2A and FIG. 2B are schematic illustrations of an exemplary system for detecting potential cyberattacks in a vehicle's environment using a staged pipeline of unsupervised and supervised ML models, according to some embodiments described herein.
Figure 2B:
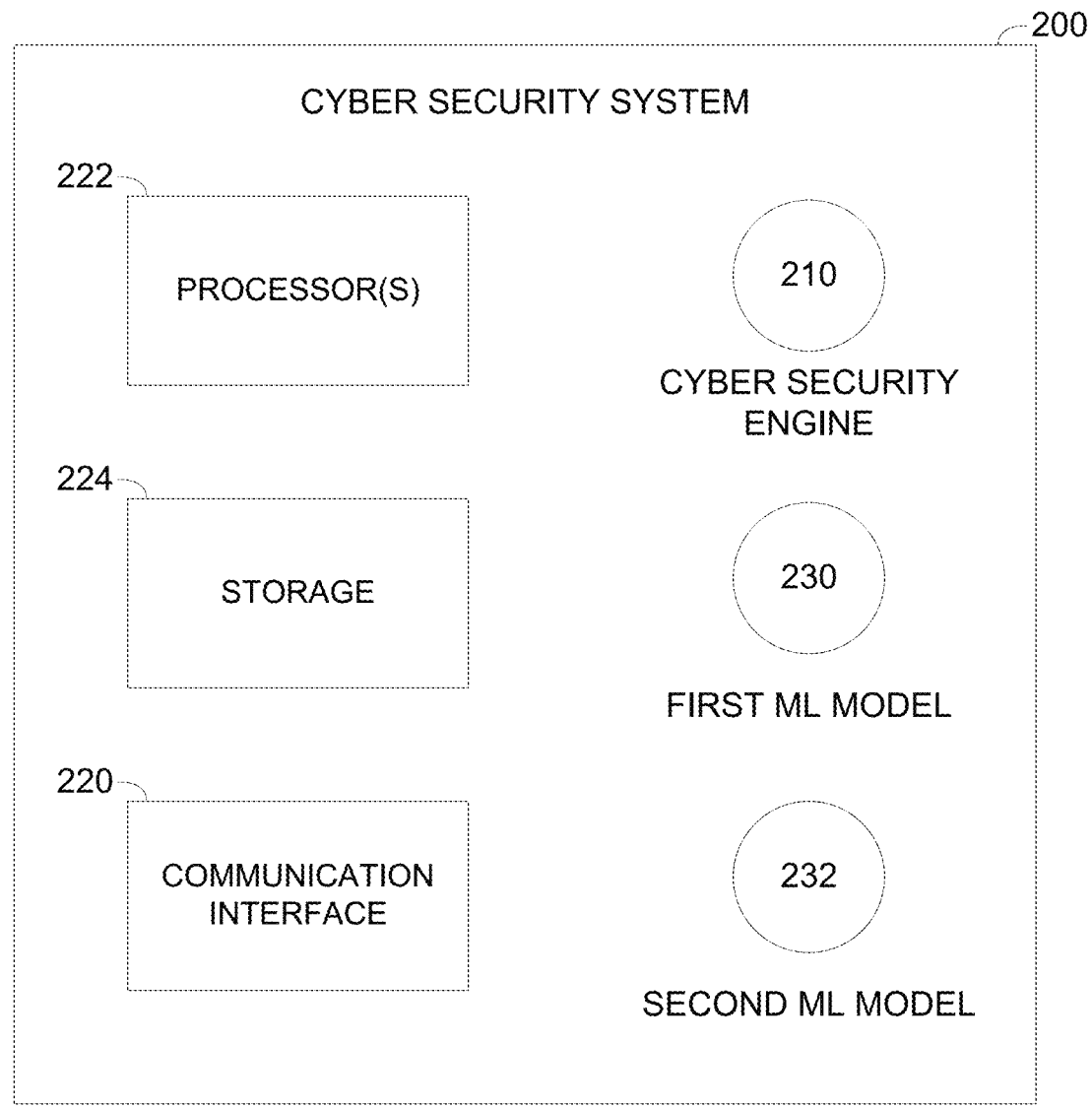

Reference is also made to FIG. 2A and FIG. 2B, which are schematic illustrations of an exemplary system for detecting potential cyberattacks in a vehicle's environment using a staged pipeline of unsupervised and supervised ML models, according to some embodiments described herein.

As seen in FIG. 2A, an exemplary cybersecurity system 200 executing a cybersecurity engine 210 configured to execute a process such as the process 100 for detecting potential cyberattack events may be deployed in each of one or more vehicles 202, for example, a car, a bus, a truck, a motorcycle, a train and/or the like.

The cybersecurity system 200 may receive vehicle operational data generated by a plurality of devices 204 deployed in the vehicle 202 which is therefore indicative of operation of the vehicle 202.

The devices 204 may include practically any data generating device, system, component and/or the like deployed in the vehicle 202, for example, a sensor, a monitoring device, an Electronic Control Unit (ECU), a user interface device, a visualization device, and/or the like.

For example, the devices 204 may include one or more sensor devices configured to measure and output sensory data indicative of one or more operational parameters of the vehicle 202. Such sensors may include, for example, a speed sensor, an accelerometer, a gyroscope, an engine temperature sensor, an engine Revolutions Per Minute (RPM) sensor, an engine coolant temperature sensor, an airflow sensor, a throttle position sensor, a fluid (e.g. oil, fuel, etc.) level sensor, a wheel air pressure sensor, a voltage, a current, environmental conditions sensor (e.g., temperature sensor, humidity sensor, rain sensor, etc.), and/or the like.

In another example, the devices 204 may include one or more monitoring devices and/or circuits configured to monitor and report a state and/or status of one or more circuits, devices, systems, hardware elements (e.g., mechanical, electrical, etc.), and/or the like of the vehicle 202, for example, status of one or more lamps, status of one or more seatbelts, presence of people in the vehicle 202, and/or the like.

In another example, the devices 204 may include one or more user interface devices configured to interact with one or more users in the vehicle 202, for example, a driver and/or a passenger. Such user interface devices which may be configured to receive and/or output data from/to the user(s) of the vehicle 202, for example, visual data, audio data, tactile data and/or the like may include, for example, a light indication, a display (e.g. dashboard display, infotainment system, etc.), a speaker, a push button, a lever, a handle, voltage, a current, a short circuit, an electric overload, and/or the like.

In another example, the devices 204 may include one or more ECUs deployed to monitor and/or control one or more systems of the vehicle 202, for example, a breaking system, an acceleration system, a steering system, an auto-pilot system, an object detection system, a light system, a cooling system, a communication system, a door lock system, an alarm system, an infotainment system, a climate control system, and/or the like. Moreover, one or more of the ECUs may generate data based on data received from one or more of the other devices 204, for example, a sensor, a monitoring circuit, a user interface device, another ECU, and/or the like.

One or more link, bus and/or interconnection architectures may be used for connecting the plurality of devices 204 to enable communication and data transfer between the devices 204. Such buses, links and interconnections, collectively designated buses 206, may include, for example, point-to-point connection between two of the plurality of devices 204, multi-point buses connecting together multiple devices 204 in parallel, serial buses, parallel buses, switch fabric, and/or the like.

For example, a subset of the devices 240, for example, a device 1 204A, a device 2 204B, and a device 3 204C may be connected via a multi-point (multi-drop) bus 206A, for example, a Controller Area Network (CAN) bus, RS-485, and/or the like.

Moreover, for one or more reasons, for example, extended length connection, device isolation, security, safety, and/or the like, one or more of the buses 206 may be segmented and one or more bridge devices 208 may be deployed in the vehicle 202 to bridge between such bus segments. For example, a bridge device 208 may be deployed to connect the bus segment 206A to another bus segment 206B, for example, CAN bus, RS485, and/or the like connecting another subset of the devices 240, for example, a device 4 204D, a device 5 204E, and a device 6 204F. The bridge device 208 may thus control data transfer between devices 204 connected to the first bus segment 206A and devices 204 connected to the second bus segment 206B.

In another example, one or more of the devices 204 may be connected via point-point buses (links, interconnections). For example, a device 7 204G may connect to the bridge device 208 separately from any other device 204 via a point-point bus 206C, for example, RS-422, Ethernet, and/or the like. In another example, a device 8 204H may also connect to the bridge device 208 separately from any other of the other devices 204 via a point-point bus 206D.

The cyber security system 200 may also connect to the bus 206 of the vehicle 202 in order to obtain the vehicle operational data generated by the plurality of devices 204. One or more configurations, implementations and/or architectures may be applied for connecting the cyber security system 200 to the bus 206. For example, the cyber security system 200 may connect to one or more segments of the bus 206, for example, the segment 206A and communicate with the devices 204 to collect their vehicle operational data. In another example, the cyber security system 200 may connect and/or communicate to one or more data collection devices deployed in the vehicle 202 which are configured to collect the data generated by one or more of the devices 204 and deliver it to the cyber security system 200.

As seen in FIG. 2B, the cybersecurity system 200 may include a communication interface 220, a processor(s) 222 for executing the cybersecurity engine 210 configured to execute the process 100 and a storage 224 for storing data and/or computer program code (program store).

The communication interface 220 may include one or more communication interfaces, ports and/or interconnections for connecting to the bus 206, for example, a CAN bus port, a serial port (e.g. RS-232, RS-422, RS-485, etc.), a Universal Serial Bus (USB) port, an Ethernet port and/or the like. Via the communication interface 220, the cybersecurity system 200, specifically, the cybersecurity engine 210, may obtain, for example, receive, collect, fetch and/or retrieve, the data generated by the plurality of devices 204 deployed in the vehicle 202.

The processor(s) 222, homogenous or heterogeneous, may include one or more processing nodes arranged for parallel processing, as clusters and/or as one or more multi core processor(s). The storage 224 may include one or more non-transitory memory devices, either persistent non-volatile devices, for example, a ROM, a Flash array, a hard drive, an SSD, and/or the like as well as one or more volatile devices, for example, a RAM device, a cache memory and/or the like.

The processor(s) 222 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 224 and executed by one or more processors such as the processor(s) 222.

Optionally, the processor(s) 222 may include, utilize and/or apply one or more hardware elements available in the cybersecurity system 200, for example, a circuit, a component, an Integrated Circuit (IC), a Field Programmable Gate Array (FPGA), an Application Specific Integrated Circuit (ASIC), a Digital Signals Processor (DSP), a Graphic Processing Unit (GPU), an Artificial Intelligence (AI) accelerator, and/or the like.

The processor(s) 222 may therefore execute one or more functional modules utilized by one or more software modules, one or more of the hardware modules and/or a combination thereof. For example, the processor(s) 222 may execute the cybersecurity engine 210 configured to execute the process 100. The processor(s) 222 may further execute one or more trained ML models, for example, one or more unsupervised ML models 230 and one or more supervised ML models 232 which may be used by the cybersecurity engine 210 to detect one or more potential cyberattack events in the environment of the vehicle 202.

According to some embodiments described herein, the cybersecurity engine 210 may be executed remotely by a remote cybersecurity system configured to communicate with one or more vehicle 202 to receive their vehicle operational data. The cybersecurity engine 210 may thus execute the process 100 for each of one or more vehicles 202 to detect potential cyberattack events in the operational environment of the respective vehicle 202.

Figure 3:
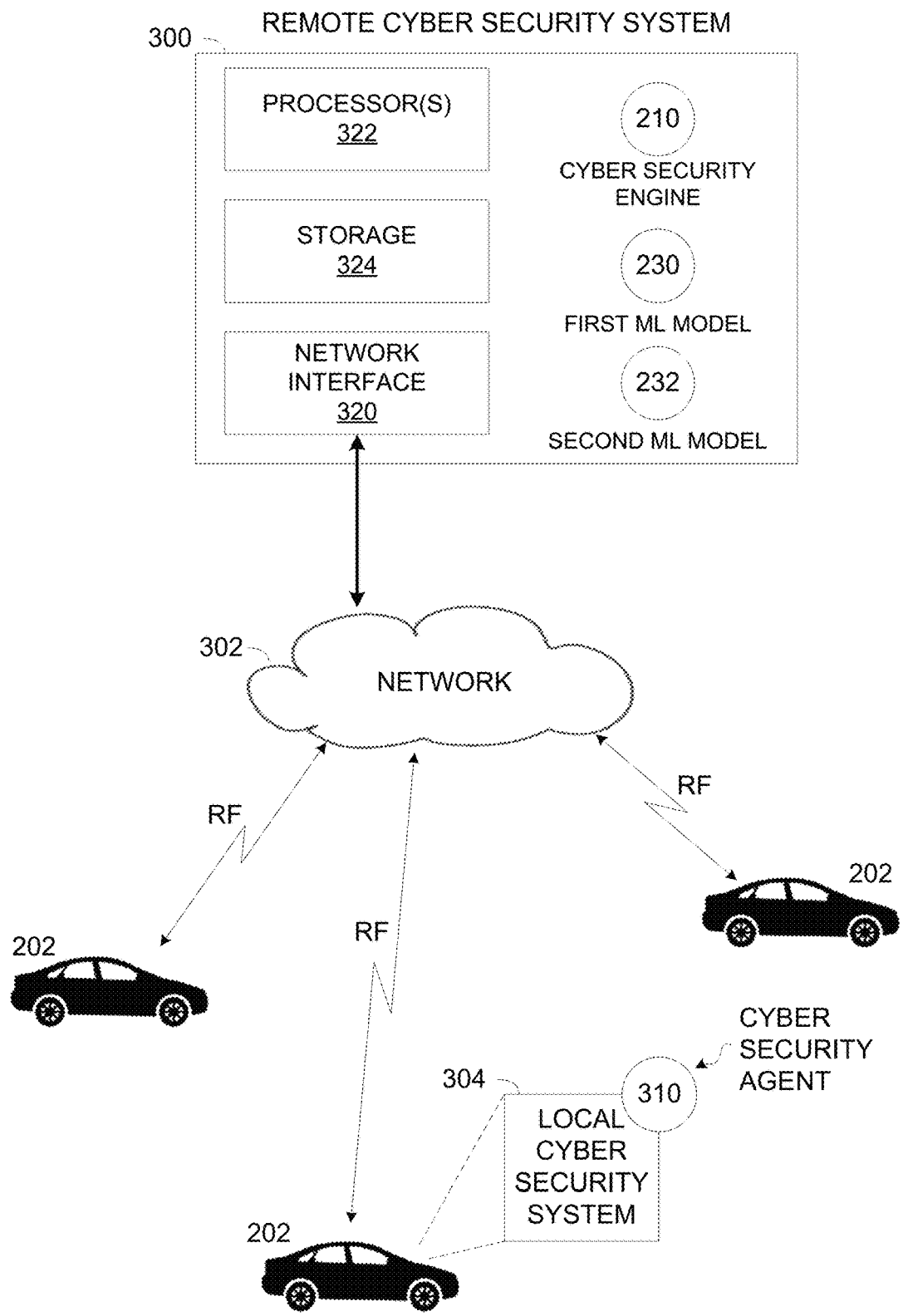
FIG. 3 is a schematic illustration of an exemplary remote system for detecting potential cyberattacks in a vehicle's environment using a staged pipeline of unsupervised and supervised ML models, according to some embodiments described herein.

Reference is now made to FIG. 3, which is a schematic illustration of an exemplary remote system for detecting potential cyberattacks in a vehicle's environment using a staged pipeline of unsupervised and supervised ML models, according to some embodiments described herein.

An exemplary remote cybersecurity system 300, for example, a server, a computing node, a cluster of computing nodes and/or the like may execute a process such as the process 100 for detecting potential cyberattack events in the operational environment of one or more vehicles such as the vehicle 202.

The cybersecurity system 300 may include a network interface 320, a processor(s) 322, and a storage 324 for storing data and/or code (program store).

The network interface 320 may include one or more wired and/or wireless network interfaces for connecting to a network 302 comprising one or more wired and/or wireless, for example, a Local Area Network (LAN), a Wireless Local Area Network (WLAN), a Wide Area Network (WAN), a Municipal Area Network (MAN), a cellular network, the internet and/or the like.

The processor(s) 322, homogenous or heterogeneous, may include one or more processing nodes arranged for parallel processing, as clusters and/or as one or more multi core processor(s). The storage 324 may include one or more non-transitory memory devices, either persistent non-volatile devices, for example, a ROM, a Flash array, a hard drive, an SSD, and/or the like as well as one or more volatile devices, for example, a RAM device, a cache memory and/or the like. The storage 324 may further comprise one or more local and/or remote network storage resources, for example, a storage server, a Network Attached Storage (NAS), a network drive, a cloud storage service and/or the like accessible via the network interface 320.

The processor(s) 322 may execute one or more software modules, for example, a process, a script, an application, an agent, a utility, a tool, an OS, a service, a plug-in, an add-on and/or the like each comprising a plurality of program instructions stored in a non-transitory medium (program store) such as the storage 324 and executed by one or more processors such as the processor(s) 322. Optionally, the processor(s) 322 may include, utilize and/or apply one or more hardware elements available in the remote cybersecurity system 300, for example, a circuit, an IC, an FPGA, an ASIC, a DSP, a GPU, an AI accelerator, and/or the like.

The processor(s) 322 may therefore execute one or more functional modules utilized by one or more software modules, one or more of the hardware modules and/or a combination thereof. For example, the processor(s) 322 may execute the cybersecurity engine 210 configured to execute the process 100 for each of one or more of the vehicles 202. The processor(s) 222 may further execute one or more trained ML models, for example, one or more of the unsupervised ML models 230 and one or more of the supervised ML models 232 which may be used by the cybersecurity engine 210 to detect one or more potential cyberattack events in the environment of one or more of the vehicles 202.

Via the network 302, the remote cybersecurity system 300 may communicate with one or more vehicles 202 to receive the vehicle operational data generated by a respective plurality of devices 204 deployed in each of the vehicles 202.

In order to collect the vehicle operational data generated by the respective devices 204 deployed in each vehicle 202 and transmit the collected vehicle operational data to the remote cybersecurity system 300, a local cybersecurity system 304 may be deployed in each of the vehicles 202.

The local cybersecurity system 304 may comprise a processor(s) such as the processor(s) 222 and a storage such as the storage 224.

The local cybersecurity system 304 deployed in each vehicle 202 may be therefore configured to execute a local cybersecurity agent 310 configured to collect the vehicle operational data generated in the respective vehicle 202. The local cybersecurity agent 310 may collect the vehicle operational data as described herein before for the cybersecurity engine 210 locally executed in the vehicle 202 by the cybersecurity system 200. The local cybersecurity agent 310 may further transmit the collected vehicle operational data to the cybersecurity engine 210 executed by the remote cybersecurity system 300 via one or more communication channels of the respective vehicle 202, for example, a cellular network, a WLAN network, a Radio Frequency (RF) channel, and/or the like.

Optionally, the cybersecurity system 300 and/or the cybersecurity engine 210 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

For brevity, the process 100 is described for detecting anomaly events and potential cyberattack events in a single vehicle 202 based on vehicle operational data generated by a plurality of devices 204 deployed in the vehicle 202. This, however, should not be construed as limiting since the process 100 may be duplicated and expanded for detecting anomaly events and potential cyberattack events in each of a plurality of vehicles 202 based on vehicle operational data generated by a respective plurality of devices 204 deployed in the respective vehicle 202.

As shown at 102, the process 100 starts with the cybersecurity engine 210 receiving vehicle operational data generated by at least some of the plurality of devices 204 deployed in a vehicle 202.

Since most aspects of the operation of the vehicle may be closely monitored and/or controlled by the plurality of devices 204, the vehicle operational data continuously generated by the devices 204 may comprise highly comprehensive and detailed information of the operation of the vehicle 202 and is thus highly indicative of the operation of vehicle 202.

For example, the vehicle operational data may include a plurality of data items comprising, for example, operational parameters, readings and/or measurements of the vehicle 202 measured, captured and/or generated by one or more of the sensor devices 204, for example, speed, acceleration/deceleration, movement vector, engine coolant temperature, engine RPM, steering wheel angle(s), throttle position, Mass Air Flow (MAF), wheels air pressure, battery voltage/current, alternator voltage/current, environmental conditions (e.g., ambient temperature, rain, snow, etc.), and/or the like.

In another example, the vehicle operational data may include a plurality of data items comprising state and/or status of one or more of a plurality of circuits, devices, systems, and/or other hardware elements of the vehicle 202 which are monitored by one or more of the monitoring devices 204, for example, vehicle 202 ignition ON/OFF, light system (lamps) status, seatbelt(s) status, doors open/close state, number of people in the vehicle 202, and/or the like.

In another example, the vehicle operational data may include a plurality of data items comprising information relating to one or more of the user interface devices 204, for example, data (visual, audio, tactile, etc.) presented to one or more users of the vehicle 202, i.e., the driver and/or passenger(s), 202 as well as data received from one or more of the users.

In another example, the vehicle operational data may include a plurality of data items comprising information relating to and/or generated by one or more of the ECUs 204 deployed in the vehicle 202 to monitor and/or control one or more systems of the vehicle 202. Such vehicle operational data may include, for example, the state and/or status of one or more of the systems of the vehicle 202, for example, the breaking system, the acceleration system, the steering system, the auto-pilot system, the object detection system, the light system, the cooling system, the communication system, the door lock system, the alarm system, the infotainment system, the climate control system, and/or the like. Optionally and often typically, the data generated by one or more of the ECUs 204 may be generated based on data received from one or more of the other devices 204.

As described herein before, the cybersecurity engine 210 may receive the vehicle operational data depending on the deployment of the cybersecurity system. For example, in case the cybersecurity engine 210 is executed by the local cybersecurity system 200 cybersecurity system deployed in the vehicle 202, the cybersecurity engine 210 may receive the vehicle operational data directly from one or more of the devices 204 and/or from one or more of the data collection device(s) deployed in the vehicle 202 to collect data generated by one or more of the devices 204 and deliver it to the cyber security system 200. In another example, in case the cybersecurity engine 210 is executed remotely by the remote cybersecurity system 300, the cybersecurity engine 210 may communicate with the cybersecurity agent 310 executed at the vehicle 202 to receive the vehicle operational data.

The rest of the process 100 is executed the same regardless of whether the cybersecurity engine 210 is executed locally at the vehicle 202 by the local cybersecurity system 200 or remotely by the remote cybersecurity system 300.

As shown at 104, the cybersecurity engine 210 may extract a plurality of features from the vehicle operational data indicative of the operation of the vehicle 202.

The plurality of features may include data items directly extracted from the operational data indicative, for example, values of the parameters, readings and/or measurements and/or the like captured in the vehicle 202 by the sensor devices 204, the state and/or status of one or more of the circuits, devices, systems, and/or other hardware elements of the vehicle 202, one or more data items relating to the user input/output, one or more data items relating to and/or generated by one or more of the ECUs 204 and/or the like.

Moreover, one or more of the plurality of features may be derived from operational data indicative rather than represent exact data items included in the operational data indicative. For example, one or more features may comprise an aggregation (e.g. sum, difference, etc.) of one or more data items included in the vehicle operational data. In another example, one or more features may comprise a manipulation of one or more data items included in the vehicle operational data, for example, an outcome of one or more data items applied with one or more functions, and/or the like.

Furthermore, since the vehicle operational data from which the plurality of features are extracted is continuously generated by the plurality of disparate devices 204 which may be unsynchronized with each other, the cybersecurity engine 210 may associate each of the features with timing (information), for example, an absolute time, a relative timing, a, incremental identifier and/or the like.

The cybersecurity engine 210 may apply one or more methods and techniques to determine the timing of each of the features. For example, the cybersecurity engine 210 may define the timing of one or more of the features based on a time stamp associated with the one or more of data item(s) of the vehicle operational data to which the respective feature corresponds. The time stamp may be associated with one or more of the data items by the device(s) 204 which generated the respective data item. In another example, the cybersecurity engine 210 may define the timing of one or more of the features based on the timing of reception of one or more data items of the vehicle operational data from the device(s) 204.

As shown at 106, the cybersecurity engine 210 may create a plurality of feature vectors from the plurality of features.

In order to effectively track, infer and/or evaluate operation of the vehicle 202 based on the features vectors comprising the plurality of features extracted from the vehicle operational data, the cybersecurity engine 210 may create the feature vectors to include features which are temporally correlated, i.e., features which correspond to vehicle operational data (items) generated during a certain time interval, for example, 30 seconds, one minute, 2 minutes, 5 minutes and/or the like.

As such, when creating the feature vectors, the cybersecurity engine 210 may temporally correlate and arrange the features according to their timing. In particular, the cybersecurity engine 210 may create the plurality of feature vectors to include sets of features arranged in a plurality of time windows each arranging a respective set of features corresponding to a respective time interval. As such, each feature vector may reflect a respective time windows arranging the respective set of features according to their timing such that each feature vector may express a respective time interval during the time of operation of the vehicle.

Moreover, the features of the feature vectors are extracted from the vehicle operational data items generated by the plurality of disparate devices 204, the features may be expressed by different values, scales, and/or the like. Therefore, in order to set a common reference which may significantly simplify processing of the feature vectors, and/or improve classification efficiency, reliability, consistency and/or robustness of the feature vectors, the cybersecurity engine 210 may normalize the feature vectors, specifically normalize the features arranged in the time windows to produce normalized time windows which are reflected by the feature vectors.

The cybersecurity engine 210 may apply one or more methods and/or techniques to normalize the time windows. For example, the cybersecurity engine 210 may map each of the features to a common scale and/or region, for example, a range of [0:1] such that each of the features may express a value in the common scale. In another example, the cybersecurity engine 210 may map each of the vehicle operational data items to a common scale and/or region, for example, a range of [0:1] such that the features extracted, derived and/or generated based on the vehicle operational data items are normalized.

Figure 4:
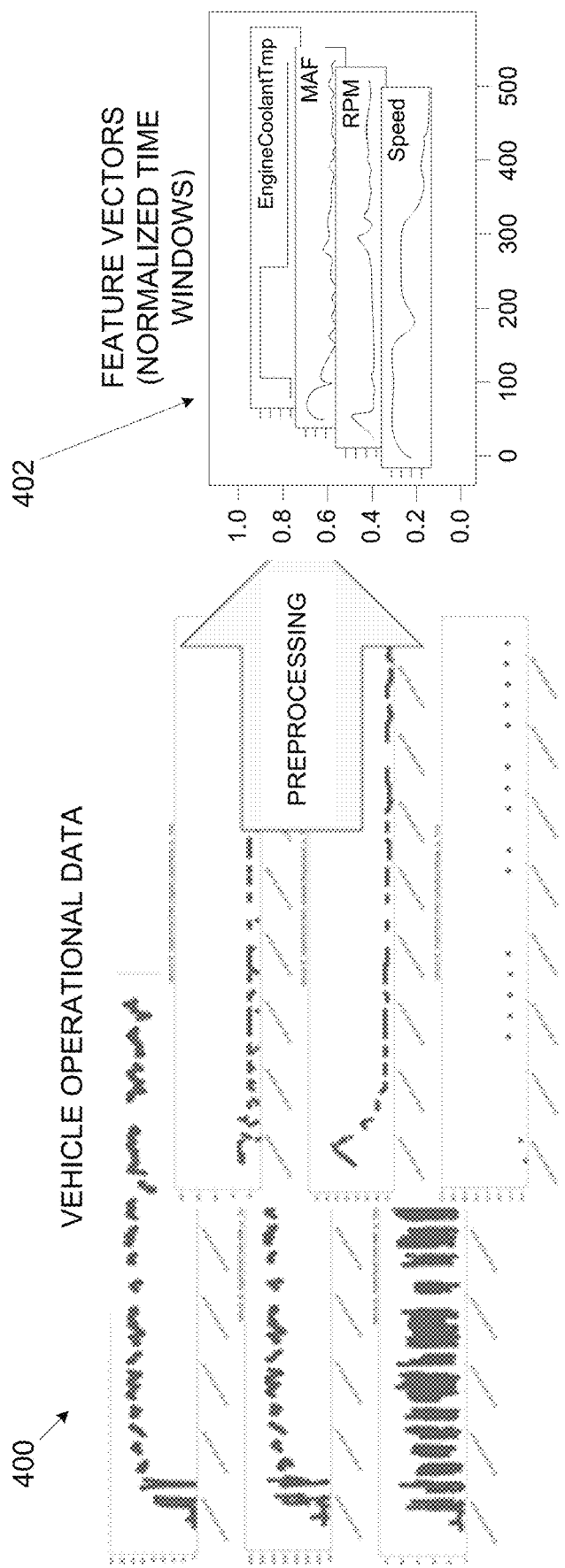
FIG. 4 is a schematic illustration of an exemplary process of generating feature vectors reflecting normalized time windows of features extracted from operational data generated by a plurality of devices deployed in a vehicle, according to some embodiments described herein.

Reference is now made to FIG. 4, which is a schematic illustration of an exemplary process of generating feature vectors reflecting normalized time windows of features extracted from operational data generated by a plurality of devices deployed in a vehicle, according to some embodiments described herein.

Vehicle operational data 400 indicative of operation of a vehicle such as the vehicle 202 may comprise a plurality of data items generated by a plurality of devices such as the devices 204 deployed in the vehicle 202.

A cybersecurity engine such as the cybersecurity engine 210 may extract a plurality of features from the vehicle operational data 400 and may further create a plurality of feature vectors 402. The plurality of feature vectors 402 may reflect a plurality of normalized time windows arranging the features according to their timing. Moreover, the cybersecurity engine 210 may normalize the features in the normalized time windows to share a common scale, range and/or region.

Reference is made once again to FIG. 1.

As shown at 108, the cybersecurity engine 210 may detect, in real-time, a plurality of anomaly feature vectors using one or more unsupervised ML models 230 applied to the plurality of feature vectors.

The unsupervised ML model(s) 230 may include, for example, a neural network, a deep neural network, a classifier, an autoencoder, a Support Vector Machine (SVM), and/or the like such as, for example, a Convolutional Neural Network (CNN), a Feed-Forward Neural Network (FNN), a Recurrent Neural Network (RNN), a perceptron, a multilayer perceptron, a Long Short-Term Memory (LSTM), and/or the like.

The unsupervised ML model(s) 230 may be trained in one or more unsupervised training session using one or more training datasets comprising a plurality of unlabeled training feature vectors. The unlabeled training feature vectors which are indicative of the operation of the vehicle 202 may the therefore comprise normal (non-anomaly) training feature vectors corresponding (i.e., reflecting, expressing and/or representing) normal (non-anomaly) events known in the operation of the vehicle 202 as well as anomaly training feature vectors corresponding to anomaly events in the operation of the vehicle 202.

The unlabeled training feature vectors may be generated based on real vehicle operational data and/or synthetic vehicle operational data.

For example, one or more unlabeled training feature vectors may be generated using real vehicle operational data captured by a plurality of devices such as the devices 204 deployed in a plurality of vehicles such as the vehicle 202 during one or more trips of these vehicles 202. Moreover, in order to generate effective, reliable and/or accurate unlabeled training feature vectors, the real vehicle operational data may be collected from a plurality of vehicles 202 similar to the vehicle 202, for example, vehicles 202 of the same model, vehicles 202 of the same manufacturer (maker), and/or the like. Each such unlabeled training feature vector may therefore comprise a plurality of features extracted from the real vehicle operational data collected from the plurality of vehicles 202 during one or more trips of these vehicles 202.

In another example, one or more unlabeled training feature vectors may be generated based using synthetic vehicle operational data created using one or more tools, systems, algorithms and/or the like configured to simulate operation of the vehicle 202 and/or similar vehicles 202. Each such unlabeled training feature vector may therefore comprise a plurality of features extracted from the synthetic vehicle operational data generated (produced) during one or more simulated trips of the vehicle 202.

Optionally, the method of claim 1, the unsupervised ML model(s) 230 may be configured to apply dimension reduction and dimension reconstruction to the plurality of feature vectors as known in the art. Reducing the dimensions of the feature vectors from their high dimensional space into a lower dimensional space may reduce and possible eliminate the effects of curse of dimensionality. Reducing the feature vectors' dimensions may also significantly reduce the computing resources, for example, processing resources, storage resources, and/or the like which may be utilized by the unsupervised ML model(s) 230 for processing, analyzing and/or classifying the high dimensional feature vectors compared to the computing resources required for processing the reduced dimensions feature vectors.

The unsupervised ML model(s) 230 may be therefore trained to classify, cluster, infer and/or otherwise learn normal (non-anomaly) feature vectors and anomaly feature vectors known for the vehicle 202.

The unsupervised ML model(s) 230 may apply one or more methods as known in the art for classifying the plurality of feature vectors to detect (infer) accordingly the anomaly feature vectors among the plurality of feature vectors.

For example, the unsupervised ML model(s) 230 may be configured to classify each of the plurality of feature vectors as an anomaly feature vector or not (non-anomaly feature vector) based on a reconstruction error of the respective feature vector. The reconstruction error which may be expressed by diff Mean Square Error (MSE) may be used by the unsupervised ML model(s) 230 to estimate, predict and/or otherwise infer whether each feature vector is an anomaly feature vector or not.

In particular, the unsupervised ML model(s) 230 may be configured to filter out the normal feature vectors expressing normal operation of the vehicle 202 and classify suspicious feature vectors as anomaly feature vectors. Since the vast majority of the feature vectors may be normal feature vectors corresponding to normal operation of the vehicle 202, the unsupervised ML model(s) 230 may classify only a relatively small group of the feature vectors as anomaly feature vectors.

Moreover, in order to ensure that most and potentially all anomaly events are detected, the unsupervised ML model(s) 230 may be configured with a detection threshold value set and/or adjusted for low and potentially no false negative detection typically at the expense of high false positive classification. The threshold may be therefore selected to produce very high recall rate, for example, 100% recall meaning that there are no false negative detections. This means that the unsupervised ML model(s) 230 may not classify any anomaly feature vector as a non-anomaly feature vector and may thus detect most and potentially all (100%) anomaly feature vector.

However, in order to ensure such high recall, the threshold may be relatively low, for example, 0.7, 075, 0.8 and/or the like meaning that the unsupervised ML model(s) 230 may produce a large number of false positive detections, i.e., the unsupervised ML model(s) 230 may classify a plurality of anomaly feature vectors corresponding to known anomaly events of the vehicle 202 as anomaly feature vectors. Moreover, due to the low threshold, the unsupervised ML model(s) 230 may also classify one or more normal feature vectors as anomaly feature vectors.

As shown at 110, the cybersecurity engine 210 may detect, in real-time, one or more potential cyberattacks using one or more supervised ML models 232 applied to the plurality of anomaly feature vectors.

The supervised ML model(s) 232 may include, for example, a neural network, a deep neural network, a classifier, an autoencoder, an SVM, and/or the like such as, for example, a CNN, an FNN, an RNN, a perceptron, a multilayer perceptron, an LSTM, and/or the like.

The supervised ML model(s) 232 may be trained in one or more supervised training session using one or more training datasets comprising a plurality of labeled training feature vectors. Specifically, the plurality of labeled training feature vectors may correspond ((i.e., reflect, express, and/or represent) anomaly events known for the vehicle 202. As such, the supervised ML model(s) 232 may be trained to classify, cluster, infer and/or otherwise learn non-anomaly feature vectors which are known for the vehicle 202.

Each of the labeled training feature vectors may be associated with a label mapping the respective training feature vector to one or more failure patterns identified for the vehicle 202 which may be traced to one or more known failures, malfunctions, abnormal operation, deviation and/or the like of one or more of the devices 204 of the vehicle 202.

The failure patterns in the operation of the vehicle 202 which are mapped by the labeled training feature vectors may be identified, characterized and/or defined based on manual and/or automated analysis of data relating to the labeled training feature vector. For example, one or more failure patterns may be identified based on analysis of one or more of the plurality of features of one or more of the labeled training feature vectors. This means that the label of one or more labeled training feature vectors may map one or more failure patterns detectable from one or more of features of the respective labeled training feature vector. In another example, one or more failure patterns may be identified based on analysis of the vehicle operational data from which the plurality of features of the labeled training feature vector are derived. In other words, the label of one or more labeled training feature vectors may map one or more failure patterns detectable from analysis of the vehicle operational data from which one or more of the features of the respective labeled training feature vector are extracted and/or derived.

Optionally, the plurality of labeled training feature vectors may be feature vectors classified by one or more of the unsupervised ML models as anomaly feature vectors. Each of these anomaly feature vectors may be labeled with a label mapping one or more of the failure patterns based on analysis of the features included in the respective anomaly feature vector and/or based on analysis of the vehicle operational data from which the features of the respective anomaly feature vectors are extracted.

As described herein before for the unlabeled training feature vectors, the labeled training feature vectors may be also generated based on real vehicle operational data and/or synthetic vehicle operational data. For example, each of one or more labeled training feature vectors may comprise a plurality of features extracted and/or derived from real vehicle operation data captured by a plurality of devices 204 deployed in a plurality of vehicles 202. Each such labeled training feature vectors may therefore comprise a plurality of features extracted from the real vehicle operational data collected from the plurality of vehicles 202 during one or more trips of these vehicles 202. In another example, each of one or more labeled training feature vectors may be comprise a plurality of features extracted from synthetic vehicle operational data created using one or more of the simulation tools, systems, algorithms and/or the like. Each such labeled training feature vectors may therefore comprise a plurality of features extracted and/or derived from the synthetic vehicle operational data generated during one or more simulated trips of the vehicle 202.

Since the vehicle operational data may be available in abundance and the unlabeled training feature vectors do not require labeling effort, the number of the plurality of unlabeled training feature vectors may be extremely large. The number of the plurality of labeled feature vectors, however may be significantly smaller than that of the unlabeled training feature vectors and in practice may constitute only a small fraction of the number of the unlabeled training feature vectors.

Optionally, one or more of the supervised ML models 232 may be further trained using semi-supervised approach in in one or more semi-supervised training session in which the supervised ML model(s) 232 may be trained using the plurality of labeled training feature vectors and further a plurality of unlabeled training feature vectors as known in the art.

The supervised ML model(s) 232 may apply one or more methods as known in the art for classifying the plurality of anomaly feature vectors to detect (infer) accordingly one or more potential cyberattack events. In particular, the supervised ML model(s) 232 may classify each of the plurality of anomaly feature vectors with respect to the leaned known failure patterns.

For example, the supervised ML model(s) 232 may compute a probability score for each anomaly feature vector, for example, in a range of [0:1]. A high probability score may indicate that the respective anomaly feature vector significantly deviates from the (known) failure pattern(s) and may be therefore indicative a potential cyberattack event. A low probability score on the other hand may indicate that the respective anomaly feature vector is significantly similar to the (known) failure pattern(s) and may be therefore classified as a false positive detection made by the unsupervised ML model(s) 230 meaning the respective anomaly feature vector is not actually an anomaly feature vector.

As shown at 112, the cybersecurity engine 210 may generate one or more alerts in case one or more cybersecurity events are detected by the supervised ML model(s) 232.

For example, the cybersecurity engine 210 may generate one or more alerts, warning and/or indications to one or more users in the vehicle 202, for example, the driver. In such case, the cybersecurity engine 210 may instruct, operate and/or otherwise induce operation of one or more of the user interface devices to inform of detection of the potential cybersecurity event(s). For example, the cybersecurity engine 210 may operate one or more displays, for example, a dashboard screen, the infotainment screen, and/or the like to display one or more warning messages. In another example, the cybersecurity engine 210 may operate a warning speaker, an alert light and/or the like to generate a warning sound and/or warning light signaling the detection of the potential cybersecurity event(s).

In another example, the cybersecurity engine 210 may transmit one or more alert messages to one or more systems of the vehicle 202. For example, the cybersecurity engine 210 may transmit alert message(s) to a control system deployed in the vehicle 202 which is configured to control movement of the vehicle 202. Such control system may initiate one or more actions to counter the potential cybersecurity event(s) and/or potential impact, damage and/or risk imposed by the potential cybersecurity event(s). For example, in case the vehicle 202 is on the move, a certain control system may operate the vehicle 202 to reduce its speed and/or come to a stop. In another example, a certain control system may block communication between the vehicle 202 and one or more remote systems, services and/or platforms to prevent remote controlling the vehicle 202.

In another example, the cybersecurity engine 210 may transmit one or more alert messages to one or more remote systems, services, platforms and/or the like related to the vehicle 202. For example, the cybersecurity engine 210 may transmit alert message(s), via a network such as the network 302, to one or more remote central monitoring and/or control systems configured to monitor and/or control a fleet of vehicles 202. Such central control system may initiate one or more actions to counter, limit and/or quarantine the potential cybersecurity event(s) and/or potential impact, damage and/or risk imposed by the potential cybersecurity event(s). For example, a certain central control system may instruct the vehicle 202 to reduce its speed and/or come to a stop. In another example, a certain central control system may prevent communication between the vehicle 202 and one or more other vehicles 202 to prevent distribution of the potential cybersecurity event(s).

Figure 5:
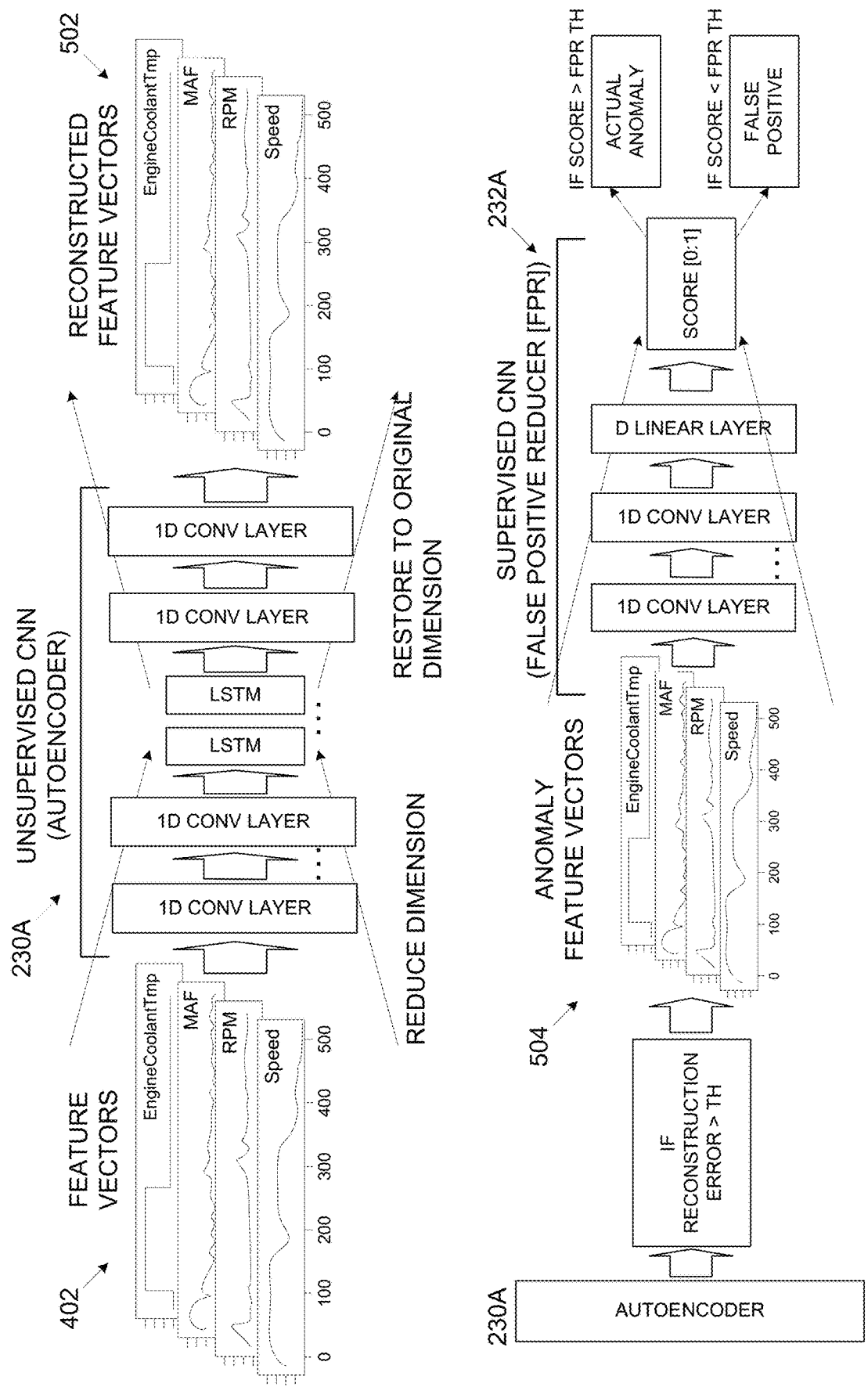
FIG. 5 is a schematic illustration of an exemplary sequence of detecting potential cyberattacks in a vehicle's environment using a staged pipeline of unsupervised and supervised ML models, according to some embodiments described herein.

Reference is now made to FIG. 5, which is a schematic illustration of an exemplary sequence of detecting potential cyberattacks in a vehicle's environment using a staged pipeline of unsupervised and supervised ML models, according to some embodiments described herein.

An exemplary sequence 500 for detecting potential cyberattacks in a vehicle's environment may be executed by a cybersecurity engine such as the cybersecurity engine 210 executing a process such as the process 100 using a staged pipeline of unsupervised and supervised ML models to detect one or more potential cyberattacks in an operation environment of one or more vehicles such as the vehicle 202.

The sequence 500 may start with the cybersecurity engine 210 applying a trained unsupervised ML model such as the unsupervised ML model 230, for example, an autoencoder 230A to a plurality of feature vectors such as the feature vectors 402 each comprising a plurality of features extracted from vehicle operational data indicative of operation of a vehicle 202 which is generated by a plurality of devices such as the devices 204 deployed in the vehicle 202.

The autoencoder 230A which may be implemented using a CNN comprising a plurality of hidden layers, for example, convolution layers, LSTM layers, and/or the like may apply dimension reduction and reconstruction to each of the plurality of feature vectors 402 thus producing a plurality of respective reconstructed feature vectors 502.

The plurality of reconstructed feature vectors 502 may be than classified to identify a plurality of anomaly feature vectors 504 using one or more classification, estimation, prediction and/or inference algorithms, methods and/or techniques. For example, the reconstruction error of each reconstructed feature vector 502 may be compared to a certain threshold (TH) configured for maximal recall, for example, 100% recall in order to eliminate false negative detection at the expense of possible high positive detection.

The cybersecurity engine 210 may apply to the plurality of anomaly feature vectors 504 a trained supervised ML model such as the supervised ML model 232, designated False Positive Reducer (FPR) 232A, for example, a CNN, in order to compute a probability score for each anomaly feature vector 504, for example, in the range of [0:1], indicating a probability of the respective anomaly feature vector 504 being an actual anomaly (event) in the operation of the vehicle 202.

The probability score computed for each anomaly feature vector 504 may be compared to a second threshold, designated FPR TH which may be set and/or adjusted for high anomaly detection performance, for example, high accuracy, reliability, consistency, robustness and/or the like.

For anomaly feature vector 504 having a probability score exceeding the FPR TH, the cybersecurity engine 210 may determine that the respective anomaly feature vector 504 is an actual anomaly (event) in the operation of the vehicle 202 which may be indicative of one or more cyberattack events. In case the probability score of an anomaly feature vector 504 does not exceed the FPR TH, the cybersecurity engine 210 may determine that the respective anomaly feature vector 504 is not a real anomaly event but rather a false positive feature vector erroneously classified by the autoencoder 230A as an anomaly feature vector 504.

Figure 6:
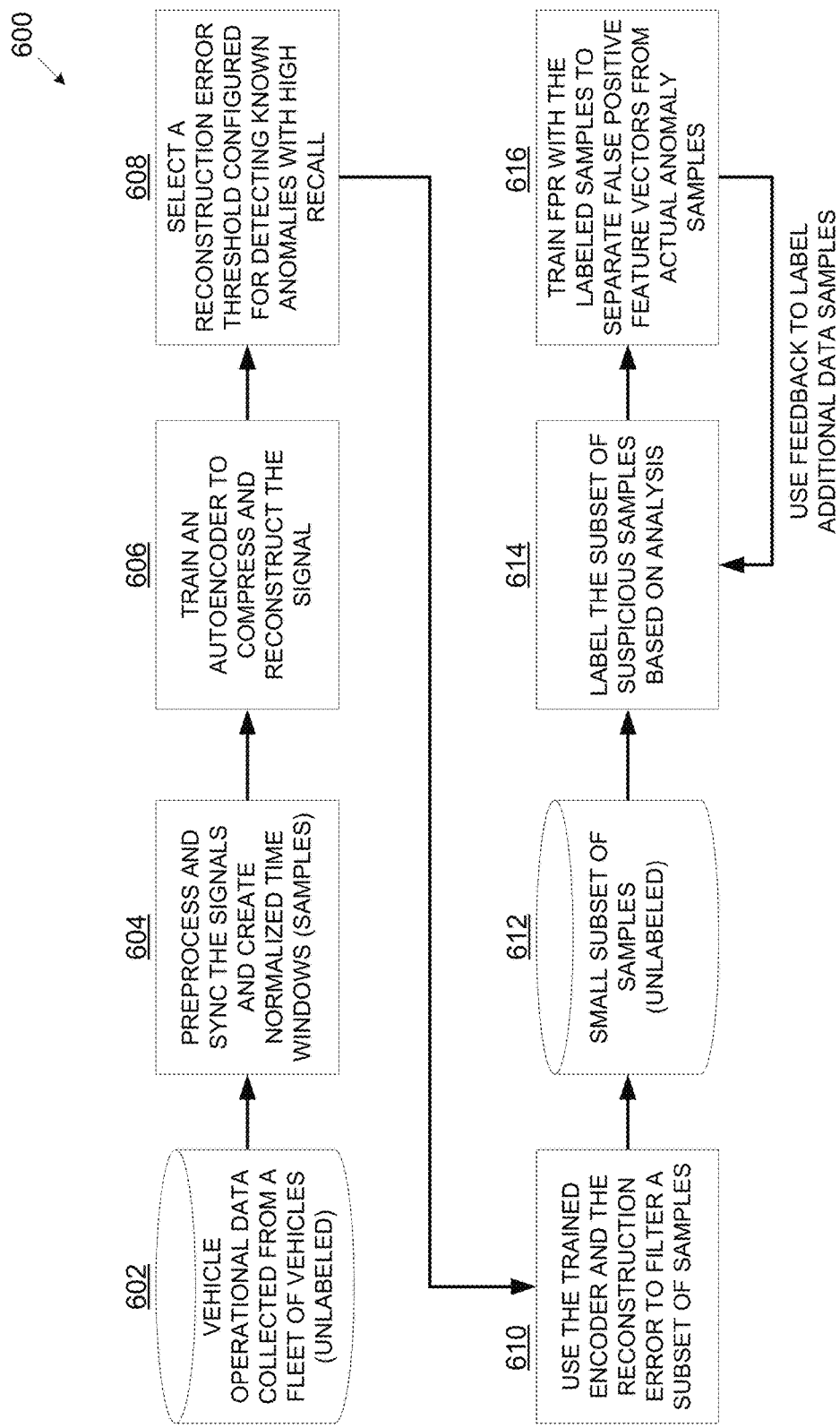
FIG. 6 is a schematic illustration of an exemplary sequence of training unsupervised and supervised ML models of a staged pipeline deployed for detecting potential cyberattacks in a vehicle's environment, according to some embodiments described herein.

Reference is now made to FIG. 6, which is a schematic illustration of an exemplary sequence of training unsupervised and supervised ML models of a staged pipeline deployed for detecting potential cyberattacks in a vehicle's environment, according to some embodiments described herein.

An exemplary sequence 600 may be applied for training one or more unsupervised ML models such as the unsupervised ML model 230, for example, an autoencoder such as the autoencoder 2320A and one or more supervised ML models such as the supervised ML model 232, for example, the FPR 232A which may be used by a cybersecurity engine such as the cybersecurity engine 210 executing a process such as the process 100 to detect one or more potential cyberattacks in an operation environment of one or more vehicles such as the vehicle 202.

As seen in 602, vehicle operational data may be collected from a plurality of vehicles 202. As seen in 604, the vehicle operational data may be used to create a plurality of training feature vectors, specifically unlabeled training feature vectors. For example, the vehicle operational data may be preprocessed to arrange a plurality of data items included in the vehicle operational data in a plurality of normalized time windows used to create the plurality of unlabeled training feature vectors.

As seen in 606, the plurality of unlabeled training feature vectors may be used to train the autoencoder 230A which may apply dimension reduction and reconstruction to the unlabeled training feature vectors, i.e., compress and reconstruct the signal. As seen in 608, a threshold (TH) may be selected, set, adjusted and/or defined to detect known anomalies with a high recall (e.g., 100% recall) to ensure no false negative detection at the expense of high false positive detection.

As seen in 610, the autoencoder 230A classifying the unlabeled training feature vectors may filter (select) a subset of the unlabeled training feature classified as anomaly feature vectors based on their reconstruction error.

As seen in 612, since they are classified by the autoencoder 230A as anomaly feature vectors, the subset of unlabeled training feature which may be significantly small may be selected and used as training samples for training the FPR 232A.

As seen in 614, each of the subset of samples which are suspicious and classified accordingly as anomaly feature vectors may be labeled to map the respective sample to one or more failure patterns known for the vehicle 202. The labeling and mapping to the failure patterns may be done based on analysis, manual and/or automated, of the features of the respective sample.

As seen in 616, the subset of samples which now comprises a plurality of labeled feature vectors may be used to train the FPR 232A to classify the feature vectors and separate between anomaly feature vectors corresponding to known failure patterns, events and/or modes of the vehicle 202 and anomaly feature vectors which may not be mapped to learned failure patterns and may be therefore indicative of one or more potentials cyberattack events.

As seen in 618, feedback may be used for the FPR 232A to label one or more of additional samples (anomaly feature vectors) which may be used to further train the FPR 232A.

Figure 7:
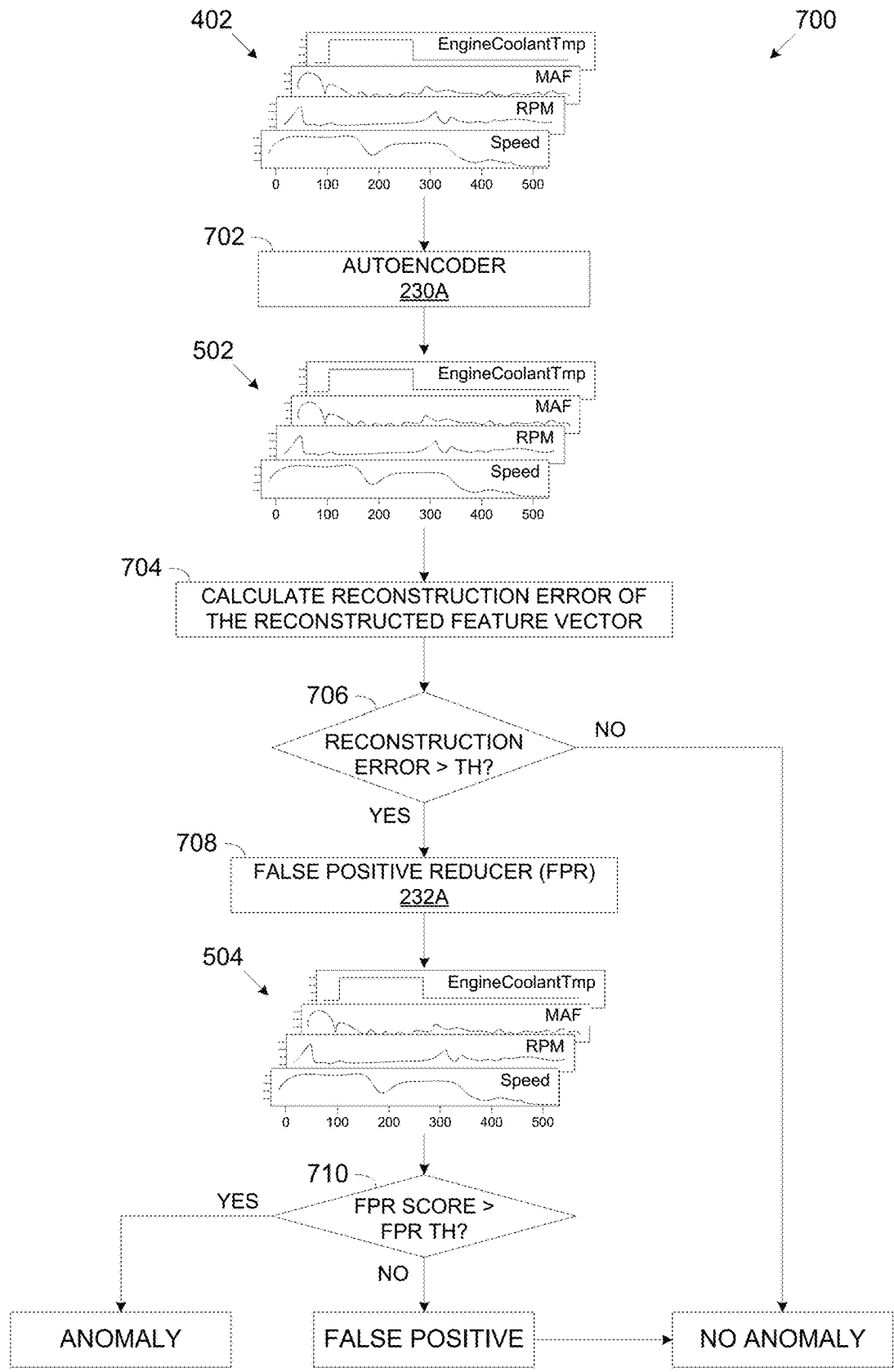
FIG. 7 is a schematic illustration of an exemplary sequence of detecting potential cyberattacks in a vehicle's environment using a staged pipeline of unsupervised and supervised ML models, according to some embodiments described herein.

Reference is also made to FIG. 7, which is a schematic illustration of an exemplary sequence of detecting potential cyberattacks in a vehicle's environment using a staged pipeline of unsupervised and supervised ML models, according to some embodiments described herein.

An exemplary process 700 describes detection phase (inference) for detecting, in real-time, potential cyberattacks targeting one or more of the vehicles 202.

After trained, the cybersecurity engine 210 executing the process 100 may use the trained autoencoder 230A and the trained FPR 232A to detect, in real-time, one or more potential cyberattacks in the operation environment of one or more of the vehicles 202.

As shown at 702 and described in step 108 of the process 100, one or more unlabeled feature vectors such as the unlabeled feature vectors 402 each comprising a plurality of features extracted from vehicle operation data of a vehicle 202 to the trained autoencoder 230A. The trained autoencoder 230A classifying the unlabeled feature vectors 402 may compress and recover each of the unlabeled feature vectors 402 to produce a plurality of respective reconstructed feature vectors 502.

As shown at 704 and described in step 108 of the process 100, the reconstruction error of each of the reconstructed feature vectors 502 may be compared to the certain threshold (TH), in particular, the TH may be configured for high recall.

As shown at 706, each reconstructed feature vector 502 having a reconstruction error which exceeds the TH may be estimated to be an anomaly feature vector and may be injected in the FPR 232A. In contrast, each reconstructed feature vector 502 having a reconstruction error which does not exceed the TH may be estimated to be a normal feature vector meaning it does not correspond to an anomaly event.

As shown at 708, the FPR 232A trained to learn feature vectors corresponding to anomaly patterns, modes and/or events of the vehicle 202 may classify accordingly each of the feature vectors classified and/or estimated to be anomaly feature vectors.

As shown at 710 and described in step 110 of the process 100, the FPR 232A classifying the anomaly feature vectors may compute a probability score for each anomaly feature vector, for example, in the range of [0:1] which is indicative of whether the respective anomaly feature vector corresponds to a known failure pattern or not. Each anomaly feature vector having a probability score exceeding the FPR TH may be estimated and classified accordingly as a real (unknown) anomaly feature vector which may be indicative of potential cyberattack event(s). However, each anomaly feature vector having a probability score which does exceed the FPR TH may be estimated and classified accordingly as a false positive detection since it may correspond to one or more anomaly events known for the vehicle 202.

Following are results of tests conducted to evaluate and demonstrate performance of the staged ML architecture comprising a pipeline of the unsupervised auto encoder 232A tuned for maximal recall followed by the FPR 232A compared to legacy architectures, in particular, compared to a stand-alone unsupervised autoencoder such as the autoencoder 230A.

The tests were conducted using "Ignite dataset" comprising 15,000 clean samples (feature vectors) corresponding to normal events, modes and/or patterns of a vehicle 202 and/or to anomaly events, modes and/or patterns known for the vehicle 202. The Ignite dataset" also includes 4,565 anomaly samples corresponding to anomaly events, modes and/or patterns which are unknown for the vehicle 202.

The stand-alone autoencoder 230A classified 14,255 of the clean samples to be indeed clean (non-anomaly) meaning that the stand-alone autoencoder 230A detected 14,255 of the clean samples. However, the stand-alone autoencoder 230A classified 745 of the clean samples as anomalies meaning that the stand-alone autoencoder 230A failed to detect 745 clean samples.

With respect to the anomaly samples, the stand-alone autoencoder 230A classified 3.978 of the anomaly samples as anomalies meaning that the stand-alone autoencoder 230A detected 3.978 of the anomaly samples. However, the stand-alone autoencoder 230A classified 587 of the anomaly samples as clean samples (no anomaly) meaning that the stand-alone autoencoder 230A failed to detect 587 anomaly samples.

The staged pipeline of the autoencoder 230A followed by the FPR 232A classified 14,905 of the clean samples to be indeed clean meaning detection of 14,905 of the clean samples while classifying 95 of the clean samples as anomalies meaning it failed to detect only 95 clean samples.

The staged pipeline classified 4,133 of the anomaly samples as anomalies meaning detection of 3.978 of the anomaly samples while classifying 432 of the anomaly samples as clean samples (no anomaly) meaning it failed to detect only 432 anomaly samples.

Computing the parameters of the stand-alone autoencoder 230A, these are: precision: 0.84, recall: 0.871413, F1 score: 0.86 and false positive rate: 0.16. The parameters computed for the staged pipeline comprising the autoencoder 230A and the FPR 232A are as follows: precision: 0.98, recall: 0.905367, F1 score: 0.94 and false positive rate: 0.02.

As evident from the parameters computed for the stand-alone autoencoder 230A and the staged pipeline based on their detection/non-detection performance, the staged pipeline significantly improves the detection performance over all parameters and aspects.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML model, DL model, neural network, and vehicle operational data are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of described herein may include a plurality of "optional" features unless such features conflict.

Throughout this application, various embodiments described herein may be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of embodiments described herein, which are, for clarity, described in the context of separate embodiments, may also be provided in combination in a single embodiment. Conversely, various features of embodiments described herein, which are, for brevity, described in the context of a single embodiment, may also be provided separately or in any suitable subcombination or as suitable in any other embodiment described herein. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

The invention claimed is:

1. A method of detecting potential malicious attacks in vehicles operational environment using staged machine learning (ML), comprising:

using at least one processor configured for:

creating, in real-time, a plurality of feature vectors each comprising a plurality of features extracted from vehicle operational data generated by a plurality of devices deployed in at least one vehicle, the vehicle operational data is indicative of operation of the at least one vehicle;

detecting, in real-time, a plurality of anomaly feature vectors using at least one unsupervised ML model applied to the plurality of feature vectors, the at least one unsupervised ML model is trained, prior to real-time operation, using a plurality of unlabeled training feature vectors;

identifying, in real-time, at least one potential cyberattack event using at least one supervised ML model applied to the plurality of anomaly feature vectors, the at least one supervised ML model is trained, prior to real-time operation, using a plurality of labeled training feature vectors, wherein the plurality of labeled training feature vectors are manually labeled based on analysis of the plurality of features of the respective labeled training feature vector and the vehicle operational data from which the plurality of features of the respective labeled training feature vector are derived, and wherein the at least one supervised ML model is trained, prior to real-time operation, to learn a plurality of anomaly events typical to the at least one vehicle using the plurality of labeled training feature vectors, each of the plurality of labeled training feature vectors is associated with a respective label mapping the respective labeled training feature vector to at least one failure pattern identified based on analysis of the plurality of features of the respective labeled training feature vector and/or the vehicle operational data from which the plurality of features of the respective labeled training feature vector are derived; and generating, in real-time, an alert indicative of the at least one potential cyberattack event.

2. The method of claim 1, wherein the at least one unsupervised ML model is configured with a threshold set to yield a maximal recall value to yield no false negative detection at the expense of high false positive detection.

3. The method of claim 1, wherein each of the plurality of feature vectors reflects a respective one of a plurality of time windows temporally arranging the plurality of features of the respective feature vector according to their timing.

4. The method of claim 3, further comprising each of the plurality of time windows is normalized.

5. The method of claim 1, further comprising configuring the at least one unsupervised ML model to apply dimension reduction and dimension reconstruction to the plurality of feature vectors.

6. The method of claim 1, wherein the at least one unsupervised ML model is configured to classify each of the plurality of feature vectors as an anomaly feature vector or not based on a reconstruction error of the respective feature vector.

7. The method of claim 1, wherein the at least one supervised ML model is further trained in at least one semi-supervised training session using the plurality of labeled training feature vectors and further using a plurality of unlabeled training feature vectors.

8. The method of claim 1, wherein at least one of the plurality of unlabeled training feature vectors and/or at least one of the plurality of labeled training feature vectors are created based on data captured by a plurality of devices deployed in a plurality of vehicles similar to the at least one vehicle.

9. The method of claim 1, wherein at least one of the plurality of unlabeled training feature vectors and/or at least one of the plurality of labeled training feature vectors are created based on synthetic data created using at least one algorithm configured to simulate operation of the at least one vehicle.

10. The method of claim 1, wherein each of the at least one unsupervised ML model and the at least one supervised ML model is a member of a group consisting of:
a neural network, a deep neural network, a classifier, an autoencoder, and a support vector machine (SVM).

11. The method of claim 1, wherein the at least one processor is deployed in the at least one vehicle such that the plurality of anomaly events and the at least one potential cyberattack event are identified locally in the at least one vehicle.

12. The method of claim 1, wherein the at least one processor is deployed in at least one remote system configured to detect the plurality of anomaly events and the at least one potential cyberattack event based on the data received from the at least one vehicle via at least one communication channel.

13. The method of claim 1, wherein each of the plurality of devices deployed in the at least one vehicle is a member of a group consisting of: a sensor, a monitoring circuit, a user interface device, and an electronic control unit (ECU).

14. A system for detecting potential malicious attacks in vehicles operational environment using staged machine learning (ML) in real-time, comprising:
a program store storing a code; and
at least one processor coupled to the program store for executing the stored code, the code comprising:
code instructions to create, in real-time, a plurality of feature vectors each comprising a plurality of features extracted from vehicle operational data generated by a plurality of devices deployed in at least one vehicle, the vehicle operational data is indicative of operation of the at least one vehicle;
code instructions to detect, in real-time, a plurality of anomaly feature vectors using at least one unsupervised ML model applied to the plurality of feature vectors, the at least one unsupervised ML model is trained, prior to real-time operation, using a plurality of unlabeled training feature vectors;
code instructions to identify, in real-time, at least one potential cyberattack event using at least one supervised ML model applied to the plurality of anomaly feature vectors, the at least one supervised ML model is trained, prior to real-time operation, using a plurality of labeled training feature vectors, wherein the labeled training feature vectors are manually labeled, and wherein the at least one supervised ML model is trained, prior to real-time operation, to learn a plurality of anomaly events typical to the at least one vehicle using the plurality of labeled training feature vectors, each of the plurality of labeled training feature vectors is associated with a respective label mapping the respective labeled training feature vector to at least one failure pattern identified based on analysis of the plurality of features of the respective labeled training feature vector and/or the vehicle operational data from which the plurality of features of the respective labeled training feature vector are derived; and
code instructions to generate, in real-time, an alert indicative of the at least one potential cyberattack event.

\* \* \* \* \*